United States Patent [19]

Brown et al.

[11] Patent Number: 4,743,398
[45] Date of Patent: May 10, 1988

[54] THERMOCHROMIC COMPOSITION

[75] Inventors: Andrew V. Brown, San Jose; Wendell W. Moyer, Atherton, both of Calif.

[73] Assignee: Raychem Corporation, Menlo Park, Calif.

[21] Appl. No.: 855,026

[22] Filed: Apr. 22, 1986

Related U.S. Application Data

[62] Division of Ser. No. 496,689, May 20, 1983.

[51] Int. Cl.$^4$ ............................ C09K 3/00; C09D 5/08
[52] U.S. Cl. .................................. 252/408.1; 252/962; 116/207; 116/216; 116/219; 374/161
[58] Field of Search ................. 436/2; 252/408.1, 962; 116/207, 216, 217, 219; 428/195, 199; 374/161, 162

[56] References Cited

U.S. PATENT DOCUMENTS

| | | | |
|---|---|---|---|
| 1,668,767 | 5/1928 | Hanson et al. | 436/2 |
| 2,261,473 | 4/1938 | Jennings | 116/207 |
| 2,928,791 | 3/1960 | Loconti | 252/962 |
| 3,465,590 | 9/1969 | Kluth | 374/160 |
| 3,816,335 | 6/1974 | Evans | 252/408.1 |
| 3,995,489 | 12/1976 | Smith et al. | 436/7 |
| 4,105,583 | 8/1978 | Glover et al. | 252/408.1 |
| 4,108,001 | 8/1978 | Smith et al. | 252/408.1 |
| 4,121,011 | 10/1978 | Glover et al. | 428/698 |
| 4,142,416 | 3/1979 | Smith et al. | 252/408.1 |
| 4,232,552 | 11/1980 | Hof et al. | 116/207 |
| 4,344,909 | 8/1982 | DeBlauwe | 116/207 |
| 4,428,321 | 1/1984 | Arens | 116/207 |
| 4,450,023 | 5/1984 | De Blauwe | 252/408.1 |

FOREIGN PATENT DOCUMENTS

| | | |
|---|---|---|
| 1228232 | 4/1971 | United Kingdom . |
| 1384621 | 2/1975 | United Kingdom . |
| 1488553 | 10/1977 | United Kingdom . |

OTHER PUBLICATIONS

U.S. patent application Ser. No. 403,451 filed 7/30/82, Brown et al.
Day, Jesse H., Chem. Reviews, 68:6, pp. 649-657, Nov., 1968.
Day, Jesse H., Chem. Reviews, pp. 65-80, 1963.

Primary Examiner—John F. Terapane
Assistant Examiner—Catherine S. Kilby
Attorney, Agent, or Firm—Edith A. Rice; Herbert G. Burkard

[57] ABSTRACT

A temperature indicating composition is provided for use on recoverable articles so that heating to produce recovery or to activate a heat-activatable sealant can be monitored. The composition comprises a thermochromic colorant in a binder and an activator that causes the thermochromic colorant to change color at a temperature lower than the temperature at which the colorant would change temperature in the absence of the activator. The thermochromic colorant can be folic acid and the activator can be an acid that has a pK of less than 4.2.

14 Claims, No Drawings

THERMOCHROMIC COMPOSITION

This application is a division of application Ser. No. 496,689, filed May 20, 1983.

BACKGROUND OF THE INVENTION

The present invention relates to temperature indicating compositions for use on recoverable articles so that heating to produce recovery or to activate a heat-activatable sealant can be monitored.

Temperature indicating compositions have found wide-spread use where warning of temperature excursion is required or where a heating process is to be monitored. They are of special use where the desired maximum temperature would not otherwise be apparent to the operator; an example of this is in the use of heat-recoverable materials where a certain temperature is required for proper recovery but where a higher temperature could cause damage. Such recoverable materials are commonly used for sealing, the effectiveness of which is enhanced by provision of a heat-activatable sealant, such as a hot-melt adhesive, a reactive epoxy adhesive or a softenable mastic, on a surface of the recoverable article which will contact the substrate to be sealed. This sealant will not be visible to the installer, who therefore needs some indication that the correct bond-line temperature has been reached. The problem has been overcome by applying to a visible surface of the article to be heated a composition, the color of which changes when an internal surface, for example, has reached some desired temperature. Such temperature indication is also applicable to articles which are recovered by means other than heat, but which require heat solely for activation of an adhesive; or which may experience heat during use. Such recoverable articles may be temporarily maintained in their dimensionally unstable configuration by a hold-out member which is removed by dissolving the adhesive bond between the hold-out and the recoverable article or by other means.

A temperature indicating composition which is suitable for use on a recoverable material will contain components that are common to any paint or ink, but they will be chosen and combined with other components to insure suitability for a substrate that will be subjected to a range of temperatures, that changes size or shape, and that should remain environmentally sealing.

The basic components are a colorant, a binder, and often a solvent. The colorant of course gives the composition the desired color and in most paints and inks has the characteristic of permanence. The binder, or binder together with solvent where used, wets the pigment and gives the composition tack and the rheological properties appropriate to the method by which the composition is to be applied to its substrate. Once the composition is on the substrate it is dried, for example by evaporation of solvent, if present. After application, the binder will be responsible for the final film properties of the paint or ink. In general, the colorant must function as a pigment rather than as a dye for its intended application, by which is meant that it must be opaque, rather than transparent. In order to do this it must have hiding power, and the physical properties which endows a colorant with hiding power are its refractive index and insolubility. Where the colorant alone has not a sufficiently high hiding power, a further component, called an opacifier and generally white, should be added.

The formulation of a paint or ink is related not only to the method by which it is to be applied and to the properties that the final film must possess, but also to the drying method to be used. Many methods of drying are available. A brief review will be made of some of the generally applicable methods available for drying inks and paints.

As used herein, the term "drying" refers to all processes by which a temperature indicating composition changes from (i) the form in which it exists before it is applied to a substrate to (ii) the form in which it exists after it is fixed on the substrate. The term "drying" includes all the processes described below, including curing by UV radiation.

Further, as used herein the term "binder" refers to that component of the composition which imparts film forming characteristics to the composition. The binder may comprise a polymeric or pre-polymeric material which cures or polymerizes, or it may comprise such a polymeric or pre-polymeric substance together with a solvent. The term binder is used for the film forming component at all states. Thus the binder can be in liquid form as it is before it is applied to the substrate or in solid form as it is after it has been applied to the substrate and dried.

Drying can occur by penetration: the entire composition is absorbed into the substrate. This is of more use for dyes than pigments since a dye is entirely dissolved in its vehicle. It has not been used on heat-shrink products which are generally non-absorbent.

A second method for drying is hardening of a binder by oxidation. This has not been used on heat-shrink products.

An important method of drying is by solvent evaporation, and this is the technique used for paints that have been used on recoverable products. The paint comprises a pigment suspended in a resin-solvent system, and after application the solvent is removed leaving behind the solid resin. This system is applicable both to paints and to the three major printing techniques: typographic, planographic, and intaglio. The rate of drying can easily be controlled: it is increased by heat, and with heat can be very rapid. Many resin-solvent systems have been developed which satisfy all the requirements as regards, odor, toxicity, color, solvent power, rate of evaporation, boiling range, combustibility and viscosity. The system is highly versatile allowing application by a variety of methods to a variety of substrates.

Polymerization of a binder can also cause the desired change from liquid to solid. A common example of this is styrenated polyester resins containing an appropriate catalyst which promotes curing of the resin after application to the substrate. Newer techniques involve initiating a polymerization reaction by means of infrared radiation, microwaves, dielectric, electron beams or ultra-violet radiation.

Another technique for drying is by means of precipitation. The vehicle in which the colorant is carried is a solvent plus binder, and a further substance is added selectively to precipitate the binder.

Drying can also be obtained by using a temperature indicating composition that includes a UV curable binder and an initiator which on exposure to UV radiation initiates a polymerization reaction in the binder.

Some of the systems that have been used for temperature indicating compositions will now be reviewed.

In U.S. Pat. Nos. 4,142,416, 4,108,001 and 3,995,489 to Smith, compositions are used to detect overheating in electrical apparatus. A current of air is passed through the apparatus to cool it, and parts of the apparatus that are cooled by the current of air are coated with an organic composition which decomposes and thermoparticulates. If overheating occurs, particles of the decomposed composition will be detected downstream of the apparatus. The specification is not concerned with themochromism, but it mentions that the organic compounds produced char when heated.

U.S. Pat. No. 3,816,335 discloses incorporation of an inorganic themochromic colorant throughout the body of a heat-recoverable plastic article. A problem that can occur with some inorganic systems is a tendency for the base polymer to become degraded under the action of the colorant and heat. This problem was solved in U.S. Pat. No. 4,105,583 where it was proposed that zinc borate and zinc sulfide should be added to some inorganic systems. Other active ingredients were also mentioned. The disclosures of U.S. Pat. No. 4,105,583 and of U.S. Pat. No. 3,816,335 are incorporated herein by reference. In U.K. Patent Publication No. 2,038,478, equivalent to U.S. Pat. No. 4,344,909 a move was made away from inorganic colorants to the use of organic materials that melt and decompose at the desired temperature, thus causing a color change. In this case the thermochromic ingredient is applied in an aqueous or other vehicle, or as part of a solid formulation such as a wax. The disclosure of this publication is incorporated herein by reference.

This use of organic materials on recoverable articles can be improved by selection of the binder so that decomposition products of the thermochromic colorant were trapped thereby insuring irreversibility. This is disclosed in U.K. Patent Publication No. 2,077,919, equivalent to U.S. Pat. No. 4,450,023 the disclosure of which is incorporated herein by reference.

The majority of these compositions comprise a pigment, an opacifier, a binder and a solvent. They thus rely, like many paints and inks, on evaporation of a solvent.

U.S. patent application Ser. No. 403,451, filed on July 30, 1982, by Andrew B. Brown, Tamar Gen, and Gary R. Weihe, discloses UV curable temperature indicating compositions. This application is incorporated herein by this reference.

The following are desirable features of temperature indicating compositions:
1. No toxicity, either before or after being heated.
2. No toxic fumes when heated.
3. No adverse affects on the substrate to which the composition is applied.
4. An easily visible color change: preferably a color change from a bright color visible even in dark manholes and above ground when viewed silhouetted against the sky, to another easily visible color such as black.
5. A color change that is irreversible.
6. Good hiding properties, i.e. opaque, particularly when the substrate is black, both before and after the color change.
7. A sharp color change at the conversion temperature.

Great difficulty has been experienced in finding suitable thermochromic indicating compositions for many heat recoverable substrates, such as substrates made of materials that recover at temperatures below 150° C.

For example, difficulty has been experienced in finding a suitable temperature indicating composition for heat recoverable polyethylene, which recovers at about 135° C. The thermochromic colorant often used for polyethylene is allantoin. Allantoin has poor hiding power, and thus must be applied in thick layers. Therefore, it is generally unsatisfactory for UV curable systems which are applied in thin layers. Further, when allantoin is applied in thick layers, only the outer layer may change color. In use, the outer layer can rub off or the inner layer can bleed through to the outer layer, thereby hiding the color change. Thus, when the part is inspected at a later time, it is impossible to tell whether the part was adequately heated.

In view of this problem, it is apparent that there is a need for temperature indicating compositions that satisfy the above-mentioned requirements, and also can be used over a wide range of temperatures, including temperatures below 150° C.

SUMMARY

The present invention is directed to temperature indicating compositions that satisfy this need, and also heat recoverable articles having the dried temperature indicating composition on a surface thereof.

What has been discovered is a technique for adjusting over a very broad range the temperature at which temperature indicating compositions change temperature. The technique is particularly useful for adjusting over a very broad range the temperature at which temperature indicating compositions containing folic acid change color. The technique also has the effect of increasing the blackness of the final converted temperature indicating composition containing folic acid.

According to the present invention, a liquid temperature indicating composition comprises:
  (a) a binder;
  (b) a thermochromic colorant that changes color at a temperature T1; and
  (c) an effective amount of activator that the colorant changes color irreversibly at a temperature T2, T2 being at least 20° C. less than T1, the color change being substantially complete over a 10° C. temperature range.

A preferred composition comprises as the activator a crystalline organic acid, such as tartaric acid, that has a pK of less than 4.2 and that is solid in the composition at room temperature, both before and after the composition dries. Such an activator is particularly suitable when the colorant is folic acid.

While not bound by theory, it is believed that what occurs with an acid activator is that the activator melts at about T2, thereby activating the thermochromic colorant so that the color change occurs. With folic acid, color changes at temperatures as low as room temperature have been effected, while a temperature indicating compositions containing folic acid without the activator change temperature at about 240° to 250° C.

In another version of the invention, the activator is an acid precursor that when exposed to UV light or heat forms an acid that has a pK of less than 4.2. For example, the precursor can form an acid when exposed to UV light, where the acid is solid in the dried composition and melts at about T2. Alternatively, the precursor can form an acid when heated to about T2, where the acid is soluble in the composition. Alternatively, the precursor can form an acid when exposed to heat at a temperature less than T2, where the acid does not dissolve in the composition until the composition is heated to about T2.

A temperature indicating composition particularly suitable for heat recoverable polyethylene has folic acid as the colorant and tartaric acid as the activator. Preferably the composition comprises at least about 5% by weight folic acid based on the weight of the composition so that an easily visible color change occurs, and less than about 80%, by weight folic acid. For a composition having a UV-curable binder, preferably the composition contains less than about 40% by weight folic acid. For effective activator activity, the composition contains at least 5% by weight activator based on the weight of folic acid. Preferably the composition contains less than about 100%, and more preferably less than about 40%, by weight activator based on the weight of the folic acid because at higher levels, no beneficial effect results and it can lead to an over-filled composition.

These and other features, aspects, and advantages of the present invention will become better understood with reference to the following description and appended claims.

DESCRIPTION

The present invention provides a liquid temperature indicating composition suitable for application such as by coating to a heat recoverable substrate. The composition comprises a binder, an organic thermochromic colorant that changes color when heated, and an activator that causes the thermochromic colorant to change color at a temperature at least 20° C. less than the temperature at which the colorant would change color in the absence of the activator. The color change is sharp, the color change being substantially complete over a narrow temperature range of about 10° C.

Preferably the temperature indicating composition is UV curable for reasons that will be presented below. Thus, the present invention will be described principally with regard to UV curable systems. However, it is to be realized that this invention is usable with other temperature indicating compositions, including those that dry by penetration, by oxidation, solvent evaporation, and precipitation. Further, the composition need not be a liquid, but can also be a paste or a crayon.

The recoverabl article may be a recoverable polymeric material or a memory metal such as a beta brass or a nickel-titanium alloy. In particular, the recoverable article may be a wrap-around or tubular sleeve, or other hollow article, having a heat activatable adhesive on an inner surface.

A UV-curable temperature indicating composition comprises:

(a) a UV curable binder which in curing is capable of adhering to a recoverable substrate;

(b) a thermochromic colorant which produces in the composition a substantial color change when the composition is heated to a temperature T1;

(c) an initiator which on exposure to UV radiation initiates a polymerization reaction in the binder; and (d) an effective amount of an activator for causing the thermochromic compound to change color at a temperature T2, T2 being at least 20° C. less than T1.

The binder ordinarily will contain a reactive oligomer which polymerizes when initiated by the action of UV radiation on the initiator or by other means. The reactive oligomer is the primary, and may be the sole, component of the binder and is thus responsible for the bulk of the performance properties of the binder. The binder may, however, also contain a reactive diluent which will in general comprise one or more monofunctional and multifunctional monomers; the function of this component is to act as a non-evaporating solvent and to provide further cross-linking sites.

Of all the drying techniques available, the use of UV curing gives to the composition particular advantages. A correct choice of binder, colorant, initiator, catalyst, and optional additives allows a composition to be produced which is suitable on articles such as polyolefins and other plastics.

The following description will examine the several requirements of such a composition, outline the chemistry of the major components and finally give examples of preferred formulations. In the light of this the chemist skilled in the arts of thermochromism, UV curing, and printing will be able to select a formulation which fulfills his requirements.

The first quality of paint or ink is its color, and in the case of temperature indicating paint or ink, color above and below the transition temperature must be considered. The color must be chosen bearing in mind the color of the substrate to which it is to be applied, and the conditions under which it is to be viewed. Recoverable articles for encapsulation are often black and in dark manholes or above ground and viewed silhouetted against the sky where they may be difficult to see. In either case a bright colored composition is desirable. Where the substrate is black the composition must have good hiding power, either before or after the color change, and any deficiency here can be made good by the addition of an opacifier such as titanium dioxide, the higher refractive index allotrope, rutile, being preferred. If the thermochromic colorant has ideal properties except for its color, this can be modified by adding a tinting agent.

The color change is preferably quick and irreversible. Where the color change is irreversible the composition will act as a permanent record of the temperatures to which the substrate was subjected so that inspection can be made sometime after the heating occured.

The composition must adhere well to the substrate, so the chemical nature of the substrate and the adequacy of any surface cleaning being undertaken must be considered. In the context of recoverable plastics, adherence is regarded as satisfactory if the composition is not removed by adhesive tape pulled from a surface that has previously been scored with a blade. Adhesion is a tougher requirement in the case of a recoverable material than a dimensionally stable material since the conformational change may lead to cracking or peeling. Furthermore, it is desirable that the coating can retain its integrity under those conditions which the recoverable material itself is expected to be able to endure. The recoverable material may be tested for elongation, pressure or temperature cycling and flexing, etc., and proper adhesion of the composition is preferably maintained throughout such tests. In addition to remaining adhered, it is clearly necessary that the composition does not impair the performance of the substrate to such an extent that it no longer passes the tests by which it will be judged.

The technique used and the conditions under which the composition is applied to the substrate will also affect the choice of components of the composition. The following can be regarded as desirable features of the composition before coating:

1. Ready availability
2. Viscosity suitable for printing
3. Long shelf life and no activation by normal incandescent lighting
4. Low volatility and flammability
5. Good hiding power for very thin layers
6. Fast cure rate
7. No ancillary component to be recycled
8. Heat not required for satisfactory cure rate The UV system of curing allows a composition to be produced which is particularly valuable in each of these respects. In particular, very high cure rates can be obtained which, together with a printing technique, allows material to be coated with the composition extremely rapidly. The coating can be applied very thin, if printed, and formulations can be prepared which give sufficient hiding power at a thickness of 5 microns or less. Where the colorant itself lacks sufficient hiding power and it is undesirable to add normal opacifying agents because of their modifying influence on the final temperature converted color, it has been discovered that the components of the binder itself can be chosen to act as an opacifier on curing. Thin coatings have the advantages of a satisfying appearance, prevention of cratering when flame treated, and a reduction in the quantity of composition that has to be manufactured, stored, processed, and used. A UV curable system need not, and generally will not, involve any solvent; this avoids the energy required for vaporization and avoids any costly re-cycling apparatus. The fact that no thermal energy is required is of particular use in conjunction with an irreversible thermochromic colorant and with an essentially irreversible recoverable substrate. If excessive heat had to be applied to adhere the composition to the substrate the resulting product would of course be quite useless.

The following remarks on the chemistry of the components of the composition show how these objectives can be achieved. The binder will be discussed first.

The basis of the binder is a reactive oligomer or prepolymer which polymerizes when subjected to UV radiation in the presence of a suitable initiator. A second component of the binder is a reactive diluent which modifies the cure rate and, for example, the viscosity of the uncured composition. The principal properties of the final cured resin, however, are generally imparted by the reactive oligomer component. The reactive oligomer preferably constitutes about 30–80% by weight of the composition. The binder must be capable of adhering to the substrate on curing, but it may of course also wet or adhere to the substrate before curing.

Reactive oligomers or prepolymers are customarily used in conjunction with free monomeric and polyfunctional compounds. The functions of added monomers are to modify the properties of the final cured resin and to reduce the viscosity of the oligomer which ordinarily would be too high for conventional application techniques without these "reactive diluents." Even when reactive diluents are used, it is often difficult with filled systems, such as compositions containing thermochromic pigments, to achieve the low viscosity or rheological properties needed for the chosen printing or other coating technique. The "reactive diluent" may comprise from 5–80, preferably from 45–65%, by weight of the UV curable binder.

Four broadly defined classes of binder oligomers will be mentioned: epoxides; unsaturated polyesters; acrylated resins such as acrylated epoxides, acrylated polyesters, acrylated polyethers, acrylated polyurethanes; and polyene/thiols.

An example of the first group is the cycloaliphatic diepoxide, ERL 4299 available from Union Carbide. This product will give excellent adhesion to polyethylene and other plastics substrates. The chain length between the two functional groups can be altered to vary the flexibility of the final film, for example, by selecting alternative diepoxides. If need be, flexibility can be further improved by incorporating an extender such as polyethylene glycol, a molecular weight of about 400 being recommended. An alternative epoxide is that manufactured by Ciba Geigy under the designation CY179. They can be produced by alkaline condensation of epichlorohydrin and a dihydric phenol.

The preferred group of binders is the acrylated resins, which can give high cure rates. Polymerization can be carried out in a solvent and the resin/solvent system applied to the substrate, followed by evaporation of the solvent. What is preferred, however, is to initiate polymerization after the composition is applied, thereby dispensing with the solvent. Since these resins contain vinyl groups, polymerization is initiated by free radicals. Some free radical polymerizations are inhibited by oxygen, and may thus require provision of an inert atmosphere. Initiators required can easily be formulated free of other undesirable elements, such as fluorine, which is present in many cationic initiators and which is considered undesirable in some environments.

Acrylated oligomers sometimes are low molecular weight acrylic polymers which contain residual unsaturated acrylate or methacrylate functionality. Usually, however, the term "acrylated oligomer" applies to low MW polymers of several sorts which are terminated by unsaturated acrylic or methacrylic ester groups. These base polymers commonly are in the class of polyester, ether, urethanes, and epoxides, or combinations of these, but for ease of discussion they may merely be referred to as reactive or unsaturated acrylates, polyesters, urethanes, epoxides, etc. It should be understood that the only active functionality in these resins is that of the terminal acrylate or methacrylate groups in most cases. Seven broad classes are listed below, together with some examples.

| | |
|---|---|
| 1. Acrylatad acrylics | Celrad 1700 (Celanese Corp.) |
| 2. Acrylated esters | |
| 3. Acrylated urethanes | Uvithane 893 also Uvithanes 782, 783 and 788 (Thiokol Corp) |
| 4. Acrylated epoxides | Epocryl 370 (Shell Chemical Co.) Celrad 3200 (Celanese Corp.) |
| 5. Acrylated ether-urethanes | Purelast 186 (Polymer Systems Corp.) |
| 6. Acrylted amide | |
| 7. Acrylted carbonate | |

Mono-functional as well as these multi-functional products can be produced. A multi-functional product, such as a difunctional product, will be used to produce a crosslinked resin.

In addition to the series of acrylates, a corresponding series of methacrylates exist. In general, the methacrylates are harder than the corresponding acrylates due to a more rigid molecular structure, and this may result in a reduction of flexibility. Acrylates will in general cure faster than the corresponding methacrylates.

Acrylated urethanes can be produced by reacting hydroxy-containing acrylates with isocyanates. Diisocyanates would produce urethane diacrylates. When these compounds are used as the oligomeric or prepolymeric sole component of the binder, they usually have too high a viscosity. As mentioned above, this can be overcome by adding a reactive diluent. Acrylated urethanes, for example, will be chosen where good flexibility and abrasion resistance is desired. Where the molecular chain is thus extended the acrylated urethane behaves more like a urethane and less like an acrylate.

Acrylated epoxides will be similar to acrylated esters, but they are classified in this way due to the method by which they have been prepared. They are usually derived from epoxy ring opening by acrylic acid.

The binder may also comprise a mercaptan/olefin system which reacts by free radical addition of mercaptan to an olefin. Olefins have a tendency to homo polymerize so the conditions must be chosen to insure that the rate of hydrogen transfer from mercaptan is faster than homopolymerization rate.

The reactive diluent preferably used in conjunction with the reactive oligomer may be either monofunctional or multifunctional monomers or combinations thereof. Both are used for viscosity adjustment and act as nonvolatile solvents. Where reduced viscosity is the primary consideration, monofunctional diluting monomers may be used, and where high curing rates and a highly cross-linked product are desired, diluting monomers of higher functionality should be added. Materials suitable as the reactive monomers include monoacrylates, diacrylates, triacrylates, tetraacrylates, and other polyacrylates, corresponding methacrylates, vinyl ethers, vinyl esters, vinyl acrylates and unsaturated acids and their corresponding anhydrides. Some examples are given below:

isobornyl acrylate
ethylhexyl acrylate
trimethylpropyl triacrylate
butyl acrylate
tetrahydrofurfuryl acrylate
trihydroxypropyl methacrylate
ethoxyethoxyethyl acrylate
hydroxypropyl methacrylate
hexanediol diacrylate
polyethylene glycol diacrylate
polyethylene glycol dimethacrylate
propylene glycol acrylate
triethylene glycol diacrylate
ethoxyethyl acrylate
pentaerythritol acrylate
phenoxyethyl acrylate
hydroxypropyl acrylate
pentaerythritol triacrylate
pentaerythritol tetraacrylate
vinyl ester of versatic 10 acid
N-vinyl pyrrolidone
styrene
vinyl toluene
itaconic acid
maleic anhydride The initiator required in the temperature indicating composition can be any of many well known compounds and it preferably is present in an amount equal to about 2-7% by weight of the binder. The initiator will be chosen according to whether ionic (almost invariably cationic) or free radical polymerization is appropriate. Free radical polymerization is generally preferred since a greater variety of reactive materials are available, cure rates are generally faster, use of a wider range of pigments is possible, and cure whitening, to be discussed below, can occur. A disadvantage however is oxygen inhibition. The types of initiator available can be classified in terms of mechanism or in terms of chemical type (especially acyloins, aromatic carbonyls and polyhalogenated compounds). For free radical polymerization, benzoin alkyl ethers, which work by homolytic fission, are preferred. Examples include Darocur 1173 (EM Chemicals) and Irgacure (Ciba-Geigy), which are 2-hydroxy-2-methyl-1-phenyl propanone and 1-hydroxy-cyclohexyl phenyl ketone, respectively. An example of an aromatic carbonyl which works by hydrogen abstraction or electron transfer is benzophenone.

The preferred initiator for cationic polymerization is a 3M product designated FC508, which is a proprietary product believed to be a triarylsulfonium hexafluorophosphate salt.

In either case the preferred amount of initiator is from 1-10%, more preferably from about 2-8% by weight, based on the total weight of the composition.

The thermochromic colorant is at the heart of the system, and all the other components are present in order that the colorant may be applied to a substrate quickly, cheaply and permanently.

The first consideration when choosing a colorant is the temperature of the color change and whether or not the change is reversible. Secondly, it must be able in the composition to provide the desired hiding power. Thirdly, it must be compatible with a binder system already chosen, or it must not put undue restrains on the choice of a binder system. Fourthly, it must not adversely affect the substrate to which it is applied.

The colorant can have an effect on the efficiency of the UV cure, on rheological properties, on storage stability and on the surface or gloss of the final film. If the pigment absorbs or scatters radiation of the wavelength that activates the initiator, then efficiency of the initiator will be reduced. If the colorant becomes involved chemically in the initiator reaction it may thereby deactivate the initiator.

Both organic and inorganic compounds can be used as the thermochromic colorant, and attention is directed to the prior art patents referred to above which discuss suitable compounds.

The color change of an inorganic thermochromic material can result from decomposition of the molecule, which is preferred because it is irreversible, from a change in crystalline phase, ligand geometry or number of molecules of solvent in a co-ordination sphere. Also, colorant change can result from an alternation in the equilibrium between various complexes in solution.

With an organic thermochromic colorant, a change in equilibrium between the following species can be responsible for the color change:
Acid—base
Keto—enol
Lactone—lactam
Stereoisomers
Crystal structures For further information on the chemistry of color change, the reader is referred to J. H. Day, *Chem Reviews*, 1968 pp. 649-657 and 1963 pp 65-80, the disclosures of which are incorporated herein by reference.

Since hiding power is of importance, especially where the substrate to be coated is black, the colorant will generally be a solid material until decomposed. In very general terms, the color changes that can be expected are:

White to black or brown
Yellow to black or brown
Blue to black
Green to black or brown
Red to black
Orange to Red
Yellow to Orange
Green to yellow to orange.

Many thermochromic colorants, although often described as pigments, have poor hiding power and must be used in high concentration, often with an opacifier such as titanium dioxide, applied in thick layers. Thick layers have to be applied by brush, spray or by dipping which can involve a lot of waste. A large amount of an opacifer is undesirable, not only because it leads to higher viscosity, but also because it lessens the color change. By employing one of the UV curable binders of this invention it is possible to produce a temperature indicating composition having sufficient hiding power at a thickness of 1 micron or less, even when pigments of poor hiding power are used, rather than the more usual 25 to 100 microns. The reason that this can be done by the present invention is that certain of the UV curable binders that we have discovered can themselves act as an opacifier if desired, giving the enhanced opacity necessary for thin film coatings having good hiding power. Although we do not wish to be limited by any theory, the way in which the binder achieves this is believed to be by forming, on curing, at least two microdispersed substantial homopolymeric phases. They are able to do this in preferred embodiments due to the presence of two polymerizable components: the reactive oligomer, which preferably has acrylic ester and group functionality, and the diluting monomer which preferably is a vinyl ester. The reactivity between acrylic esters and vinyl esters during free radical initiated polymerizations is unfavorable. The unfavorable reactivity ratio (a well defined term between these two polymerizable constituents in the science of copolymerization kinetics) leads to the formation of two incompatible homopolymer systems and subsequently to microphase separation, which is manifested by a whitened appearance. The resulting cured product has higher opacity and can thus give the colorant the desired extra hiding power. In designing a formulation, therefore, one can choose the colorant for its temperature change and color change, decide what is the maximum permissible thickness of final film, and then choose a combination of binder components with reference to reactivity ratios to give the correct hiding power. Some colorants do not, of course, require this additional hiding power, in which case one has more freedom in the choice of binder.

The preferred colorant is folic acid. It has been found, as demonstrated by the examples below, to be particularly sensitive to adjustment of the temperature at which the color change occurs. Folic acid, without adjustment, changes color at about 240° to 250° C. Compositions containing folic acid with suitably chosen catalysts change color at temperatures less than 230° C., and even less than 200° C. and 150° C. Another advantage obtained with folic acid is that folic acid normally changes color from yellow to a brown/black. Compositions according to the present invention containing folic acid change color to a dark black, thereby providing a more visible color change.

Allantoin has been found to be an unsatisfactory colorant in this invention. Attempts to reduce the conversion temperature of allantoin with a strong organic acid have been unsuccessful in that although the conversion temperature was reduced, conversion occurred over a broad temperature range. A narrow temperature range of conversion on the order of 10° C. is required for heat-recoverable articles.

In one version of the invention, the activator is an organic acid. Only relatively strong acids have been found to be effective. Thus, the acid requires a pK of less than about 4.2. Of the acids tested, only one acid having a pK substantially less than 4.2 failed to reduce the conversion temperature of a composition containing folic acid. That acid is o-toluic acid which has a pK of 3.91 according to the CRC Handbook of Chemistry and Physics.

It is necessary that the activator not adversely affect the properties of the other components of the composition. It must not interfere with the UV curing process, it must not cause premature and uncontrollable degradation of the temperature indicating composition, and it must cause color change over a narrow temperature range. Preferably the activator is solid at room temperature and is insoluble in the binder system both before and after the binder system is cured. Acid activators which dissolve in the binder system have been found to prematurely and uncontrollably degrade the thermochromic colorant when it has been folic acid. Also, volatile strong acids as hydrochloric acid and trifluoroacetic acid have not been found useful, most likely because they are lost by evaporation.

The activator can also be an acid precursor that when heated or subjected to UV light forms a strong acid having a pK less than about 4.2. Such an acid precursor can be a compound that when heated as the recoverable article on which it is coated is heated degrades or decomposes to yield a strong acid at T2. Another example of an acid presursor is a material that generates an acid when it is exposed to UV light, where the acid melts or dissolves in the composition at about T2.

Not to be bound by theory, it is believed that this adjustment of the temperature at which the temperature indicating composition changes color is a result of activation of the thermal decomposition of the colorant. It has been found that soluble acids such as sulfuric acid when added to a coating composition containing folic acid cause decomposition of the folic acid and color change at room temperature. Crystalline, insoluble acids when added to a folic acid composition, have been found to promote the decomposition and color change of folic acid at a temperature generally related to the melting point of the added acid. Conversion occurs at a temperature 10°–40° C. below the nominal melting point of the acid.

The temperature at which color change occurs can vary depending on the physical form of the catalyst, i.e., powder, crystals, etc., and the method of incorporating the catalyst into the composition, i.e. grinding, milling, or simple mixing.

Exemplary of materials which serve as acid precursors and which have been found to be effective are triarylsulfonium salts which generate strong acids when exposed to UV light or heat. These salts are available from 3M under catalog numbers FC508 and 509. These salts are described in U.S. Pat. Nos. 4,058,401;

4,138,255; and 4,161,478, which are incorporated herein by this reference.

The composition of this invention contains from about 5 to about 80% by weight colorant. Preferably the composition contains at least 5% by weight activator, based on the weight of colorant, for effective activity. Preferably the composition contains up to about 100% weight of the activator, based on the weight of the colorant. Greater quantities can be used, but there is generally no beneficial effect and it can lead to an overfilled composition.

All percentages herein are based on the weight of the composition unless stated otherwise.

The major optional components of the composition are as follows:
1. Surfactants such as FC-171, a fluorocarbon surfactant (3M)
2. Thickening agent such as Aerosil R972, a hydrophobic silicon
3. Color tinting agents such as phthalocyanine green BS
4. Opacifiers, such as titanium dioxide
5. Sensitizers to improve activity of the initiator, such as FC-510 (3M)
6. Stabilizers or deactivators, such as zinc sulfide or zinc borate.

Where these components are used, the following quantities are preferred:

| | |
|---|---|
| Surfactant | 0.5–1.5% wt. |
| Thickening agent | 0–10% wt. |
| Color tint | 0–5% wt. |
| Opacifier | 0–3% wt. |
| Sensitizer | 0–8% |
| Deactivator | 0–10% |

Depending on the opaqueness of the composition and the color of the substrate, the composition is applied to a substrate to produce a coating from about 5 micrometers to about 20 micrometers thick. The more opaque the coating, the less thick need be the coating to obtain adequate hiding.

EXAMPLES

The invention is now further illustrated by the following examples. The percentage given are percentages by weight.

EXAMPLE 1, CONTROL SAMPLE

A typical UV curable TI temperature indicating composition employing folic acid as the thermal indicating substance is composed as follows:

| | % by weight |
|---|---|
| VV10 (vinylester of versatic acid, Shell Chemical Co.) | 39 |
| Irgacure 184 (1-hydroxycyolohexyl phenyl ketone, Ciba-Geigy) | 4.5 |
| Celrad 3200 (acrylated epoxy oligomer, Celanesa) | 27 |
| Folic Acid (USP, ground powder) | 25 |
| Igepal C0-430 [nonylphenoxypoly (ethyleneoxy) ethanol, GAF] | 3.5 |
| Thixatrol ST (castor oil derivative thickening agent, NL Industries) | 1.0 |

The above composition was first mixed in a Waring Blendor and then ground on a three roll paint mill. This composition when coated onto a polyolefin sheet substrate at a thickness of 10–15 microns and UV cured was bright yellow in color with good hiding power. Upon heating this sample to a temperature in the range of 240° to 250° C., the color changed sharply from yellow to dark brown-black. The color change was irreversible.

EXAMPLES 2–27, ACID CONTAINING SAMPLES

The composition described in Example 1 was modified by the addition of the acids listed below in table 2. Test specimens for observing and measuring the thermal conversion temperatures were prepared as in Example 1. The initial appearance of the coated and cured samples was identical to that of Example 1, the unmodified composition. The results are summarized in the following table. Color changes were irreversible, and were subtantially complete over a 10° C. temperature range.

Effect of Catalysts on the Thermal Conversion of Folic Acid Containing, UV Cured Coatings

| Example # | Activator | M.P., °C. | pK | Conversion Temp. °C. | Final Appearance |
|---|---|---|---|---|---|
| 2 | Maleic Acid | 131 | 1.83 | 120 | Black |
| 3 | meso-Tartaric Acid | 146 | 3.22 | 120–130 | " |
| 4 | Citric Acid | 153 | 3.14 | 130 | " |
| 5 | d-Tartaric Acid | 170 | 2.89 | 130–140 | " |
| 6 | Malonic Acid | 136 | 2.83 | 135 | " |
| 7 | Succinic Aoid | 188 | 4.16 | 135–145 | " |
| 8 | Oxalic Acid | 187 | 1.23 | 145 | " |
| 9 | Glycolic Acid | 79 | 3.83 | 150 | " |
| 10 | Ascorbic Acid | 193 | 4.10 | 150–160 | " |
| 11 | d,1-Tartaric Acid | 205 | 2.98 | 155–165 | " |
| 12 | Salicylic Acid | 160 | 2.97 | 160 | " |
| 13 | cis-1, 2-cyclohexnedicarboxylic acid | 195 | 3.45 | 180 | " |
| 14 | Fumaric Acid | 287 | 3.03 | 210 | " |
| 15 | Tannic Acid | 200 | | 190–205 | " |
| 16 | 2-Naphthoic Acid | 185 | 4.17 | 210 | Black-Brown |
| 17 | o-Toluic Acid | 103 | 3.91 | * | " |
| 18 | Benzcic Acid | 122 | 4.19 | * | " |
| 19 | Phenylacetic Acid | 77 | 4.28 | * | " |
| 20 | Adipic Acid | 153 | 4.43 | * | " |
| 21 | p-Anisic Acid | 185 | 4.47 | * | " |

-continued

| Example # | Activator | M.P., °C. | pK | Conversion Temp. °C. | Final Appearance |
|---|---|---|---|---|---|
| 22 | Suberic Acid | 140–4 | 4.52 | " | |
| 23 | Crotonic Acid | 71 | 4.64 | * | " |
| 24 | Neoheptanoic Acid | 25 | 4.89 | * | " |
| 25 | Stearic Acid | 70 | 5.00 | * | " |
| 26 | Anthranilic Acid | 146–7 | 6.97 | * | " |
| 27 | p-Toluenesulfonic Acid | 104–5 | 0.7 | 90 | Black |

*The conversion temperature was essentially the same as that of the control sample, Example 1.

EXAMPLE 28

A preferred UV curable composition is as follows:

| Component | % |
|---|---|
| VV10 Vinyl ester of versatic acid, Shell Chemical Co. | 35.1% |
| Celrad 3200 acrylated aromatic/aliphatic epoxy blend, Celanese Corp. | 28.7% |
| Irgacure 184 free radical photoinitiator Ciba Geigy | 4.6% |
| Folic acid thermochromic colorant | 25.0% |
| Phthalocyanine Green BS BASF | 0.1% |
| Ganex V-216 a poly(vinylpyrrolidone) surfactant GAF Corp. | 1.0% |
| d,l-Tartaric Acid | 5.0% |
| Thixatrol ST Colloidal Thixotropic agent, National Lead | 0.5% |

This composition exhibits cure whitening and has excellent hiding power and contrast at coatings as thin as 5 microns. The coatings produced were tough and flexible and adhered well to polyolefins, including heat recoverable polyethylene.

The composition changed color from yellow-green to a dark black over a temperature range of 160°–170° C.

It was applied to a polyethylene substrate with a gravure printer.

EXAMPLE 29

The following formula show the use of the present invention with a temperature indicating composition that dries by solvent evaporation.

| Component | % |
|---|---|
| Acryloid B66, methyl methacrylate polymer, Rohm & Haas | 4.2 |
| Perchlorethylene | 19.2 |
| 1,1,1- Trichloroethane | 57.3 |
| Folic Acid | 13.03 |
| Monastral green DuPont | .07 |
| Irganox 1010, anti-oxidant Ciba Geigy | .27 |
| Plastanox 1212, anti-oxidant American Cyanamid | .27 |
| Dioctylphthalate | .55 |
| Thixatrol ST | .11 |
| d,l-Tartaric Acid | 5.0 |

EXAMPLE 30

Using the binder of Example 1, the folic acid was replaced with Congo Red and d-tartaric acid was used as an activator. When the composition was placed on a slide, it changed color about 130°–140° C. When the d-tartaric acid was left out of the composition, it changed color at about 200° C. The color changes were irreversible and were substantially complete over a 10° C. temperature range.

EXAMPLE 31

Using the composition of claim 1, the folic acid was replaced with sugar. In one test, tartaric acid was added as an activator, and the composition changed color at about 130°–140° C. In another test, toluene sulfonic acid was added as an activator, and the uncured composition changed color at about 90° C. The color changes were irreversible and were substantially complete over a 10° C. temperature range.

EXAMPLE 32

Using the composition of Example 1, the folic acid was replaced with Methyl Orange and tartaric acid was added as an activator. The composition changed color at about 130°–140° C. The color changes was irreversible and was substantially complete over a 10° C. temperature range.

Although the present invention has been described in considerable detail with reference to certain preferred versions thereof, other versions are possible. Therefore the spirit and scope of the appended claims should not necessarily be limited to the description of the preferred versions contained herein.

What is claimed is:

1. A liquid temperature indicating composition comprising:
   (a) a binder;
   (b) folic acid; and
   (c) an effective amount of an activator for irreversibly changing the color of the composition at a temperature less than 230° C., the color change being substantially complete over a 10° C. temperature range, the activator comprising an acid that has a pK of less than 4.2 and that is solid in the binder at room temperature, both before and after the composition dries.

2. The composition of claim 1 comprising from about 5% to about 80% by weight folic acid.

3. The composition of claim 2 comprising activator in an amount of from about 5 to about 100% by weight of the folic acid.

4. The composition of claim 1 comprising activator in an amount of about 5 to about 100% by weight of the folic acid.

5. The composition of claim 1 wherein the composition changes color at a temperature less than 200° C.

6. The composition of claim 1 in which the acid is a carboxylic acid.

7. The composition of claim 1 in which the binder is UV curable.

8. The composition of claim 1 in which the activator is a tartaric acid.

9. A liquid temperature indicating composition comprising:
(a) a binder;
(b) folic acid; and
(c) an effective amount of an activator for irreversibly changing the color of the composition at a temperature less than 230° C., the color change being substantially complete over a 10° C. temperature range, the activator comprising an acid precursor that when exposed to UV light or heat forms an acid that has a pK of less than 4.2.

10. The composition of claim 9 comprising from about 5% to about 40% by weight folic acid.

11. The composition of claim 10 comprising activator in an amount of from about 5 to about 100% by weight of the folic acid.

12. The composition of claim 9 comprising activator in an amount of about 5 to about 100% by weight of the folic acid.

13. The composition of claim 10 wherein the composition changes color at a temperature less than 200° C.

14. The composition of claim 10 in which the binder is UV curable.

* * * * *